(12) United States Patent
Mandin et al.

(10) Patent No.: US 8,275,261 B2
(45) Date of Patent: Sep. 25, 2012

(54) POWER SAVING IN IEEE 802-STYLE NETWORKS

(75) Inventors: Jeff Mandin, Jerusalem (IL); Lior Khermosh, Givatayim (IL)

(73) Assignee: PMC Sierra Ltd, Herzlia Pituach (IL)

( * ) Notice: Subject to any disclaimer, the term of this patent is extended or adjusted under 35 U.S.C. 154(b) by 406 days.

(21) Appl. No.: 12/692,720

(22) Filed: Jan. 25, 2010

(65) Prior Publication Data
US 2010/0118753 A1 May 13, 2010

Related U.S. Application Data

(63) Continuation-in-part of application No. 12/104,615, filed on Apr. 17, 2008, now Pat. No. 8,000,602.

(60) Provisional application No. 61/147,103, filed on Jan. 25, 2009.

(51) Int. Cl.
*H04B 10/00* (2006.01)
(52) U.S. Cl. .......................................... 398/72; 398/113
(58) Field of Classification Search ............... 398/66–72, 398/113
See application file for complete search history.

(56) References Cited

U.S. PATENT DOCUMENTS

| | | | |
|---|---|---|---|
| 5,504,606 A | 4/1996 | Frigo | |
| 6,778,550 B1 | 8/2004 | Blahut | |
| 6,795,450 B1 * | 9/2004 | Mills et al. | 370/463 |
| 7,287,175 B2 | 10/2007 | Vereen | |
| 7,389,528 B1 | 6/2008 | Beser | |
| 7,391,746 B2 * | 6/2008 | Morimoto et al. | 370/311 |
| 7,392,412 B1 * | 6/2008 | Lo | 713/320 |
| 7,545,813 B2 | 6/2009 | Davis | |
| 7,751,711 B2 | 7/2010 | Wynman | |
| 7,920,597 B2 * | 4/2011 | Conway et al. | 370/503 |
| 7,930,373 B2 * | 4/2011 | Diab | 709/220 |
| 8,000,602 B2 * | 8/2011 | Haran et al. | 398/72 |
| 8,127,164 B2 * | 2/2012 | Diab et al. | 713/324 |
| 8,156,359 B1 * | 4/2012 | Sedarat et al. | 713/320 |
| 2005/0097378 A1 * | 5/2005 | Hwang | 713/320 |
| 2006/0029389 A1 | 2/2006 | Cleary | |
| 2006/0093356 A1 | 5/2006 | Vereen | |
| 2006/0153238 A1 * | 7/2006 | Bar-On et al. | 370/473 |
| 2008/0195881 A1 | 8/2008 | Bernard | |
| 2008/0304519 A1 * | 12/2008 | Koenen et al. | 370/477 |
| 2009/0067373 A1 * | 3/2009 | Kneckt et al. | 370/328 |
| 2009/0097428 A1 * | 4/2009 | Kneckt et al. | 370/311 |

(Continued)

OTHER PUBLICATIONS 802.3 "Part 3: Carrier sense multiple access with collision detection (CSMA/CD) access method and physical layer specifications" IEEE Computer Society. Dec. 2005., pp. 1-623.

(Continued)

*Primary Examiner* — Agustin Bello
(74) *Attorney, Agent, or Firm* — Mark M Friedman

(57) ABSTRACT

A system and method for power saving in IEEE 802-style and ITU-T G.984-style networks overcomes the limitations of conventional techniques using information from user and network devices for initiating power savings by the user or network device, enabling power savings on links such as optical networks. This innovative technique provides a system and method for communications between user and network devices, facilitating either the user or network device initiating a sleep mode for the user device. The implementation of a sleep mode in a device allows powering down of the device's transmitter and receiver for a specified length of time, during which the transmitter and receiver (also referred to as the physical interface of the device) consume diminished power.

24 Claims, 6 Drawing Sheets

U.S. PATENT DOCUMENTS

| | | |
|---|---|---|
| 2009/0119524 A1 | 5/2009 | Hays |
| 2009/0154355 A1* | 6/2009 | Diab et al. .................. 370/236 |
| 2009/0201837 A1* | 8/2009 | Diab et al. .................. 370/276 |
| 2009/0204827 A1* | 8/2009 | Diab et al. .................. 713/320 |
| 2009/0204828 A1* | 8/2009 | Diab et al. .................. 713/320 |
| 2009/0204836 A1* | 8/2009 | Diab et al. .................. 713/323 |
| 2009/0282277 A1* | 11/2009 | Sedarat et al. ............... 713/320 |
| 2009/0327506 A1* | 12/2009 | Diab ........................... 709/230 |
| 2010/0023658 A1* | 1/2010 | Diab et al. .................... 710/59 |
| 2010/0046543 A1* | 2/2010 | Parnaby ...................... 370/465 |
| 2010/0080111 A1* | 4/2010 | Diab et al. .................. 370/201 |
| 2010/0118753 A1* | 5/2010 | Mandin et al. ............... 370/311 |

OTHER PUBLICATIONS

IEEE802.3az, IEEE Standard for Information Technology—Telecommunications and information exchange between systems—Local and metropolitan area networks=Specific requirements, "Part 3: Carrier sense multiple access with collision detection (CSMA/CD) access method and physical layer specifications"I, Oct. 27, 2010, pp. 1-272.

* cited by examiner

| SLEEP_REQ | |
|---|---|
| FIELD | OCTETS |
| DESTINATION ADDRESS | 6 |
| SOURCE ADDRESS | 6 |
| LENGTH/TYPE = 88-08$_{16}$ | 2 |
| OPCODE = FF-FE$_{16}$ | 2 |
| OUI =<CONFIGURABLE> | 3 |
| EXTENDED OPCODE = 00-00$_{16}$ | 2 |
| PAD/RESERVED | |
| FCS | 4 |

FIGURE 4

| CHANGE_SLEEP_MODE | |
|---|---|
| FIELD | OCTETS |
| DESTINATION ADDRESS | 6 |
| SOURCE ADDRESS | 6 |
| LENGTH/TYPE = 88-08$_{16}$ | 2 |
| OPCODE = FF-FE$_{16}$ | 2 |
| OUI =< CONFIGURABLE> | 3 |
| EXTENDED OPCODE = 00-01$_{16}$ | 2 |
| NEW MODE:<br>   0=ACTIVE<br>    1 = CYCLIC SLEEP | 1 |
| PAD/RESERVED | |
| FCS | 4 |

FIGURE 5

| SLEEP | |
|---|---|
| FIELD | OCTETS |
| DESTINATION ADDRESS | 6 |
| SOURCE ADDRESS | 6 |
| LENGTH/TYPE = 88-08$_{16}$ | 2 |
| OPCODE = FF-FE$_{16}$ | 2 |
| OUI =< CONFIGURABLE> | 3 |
| EXTENDED OPCODE = 00-02$_{16}$ | 2 |
| WAKEUP TIME | 4 |
| PAD/RESERVED | |
| FCS | 4 |

FIGURE 6

POWER SAVING IN IEEE 802-STYLE NETWORKS

CROSS-REFERENCE TO RELATED APPLICATIONS

This application claims the benefit of provisional patent application (PPA) Ser. No. 61/147,103 filed 25 Jan. 2009 and priority from U.S. patent application Ser. No. 12/104,615, filed Apr. 17, 2008, which are incorporated by reference.

FIELD OF THE INVENTION

The present embodiment generally relates to the field of communications networks, and in particular, concerns a system and method for power saving in IEEE 802-style and ITU-T G.984-style networks.

BACKGROUND OF THE INVENTION

Background information on technology and terms can be found in the IEEE 802 and ITU-T G.984 standards. Rising energy costs, the increasing size of data centers, and the increasing density of electronic equipment are some of the reasons why businesses have become increasingly sensitive to the impact of energy consumption in operations. In particular, many companies are looking at information technology (IT) systems' power usage to determine whether the energy costs can be reduced. One aspect of power usage is energy consumption by communications equipment.

IEEE 802-style networks (which in the context of this document generally includes and ITU-T G.984-style networks) are a popular choice for both enterprise and first-mile access communications. One example of an IEEE 802-style network is the Ethernet networking standard, implemented in such standards as 100 Base-T, 10 GBASE-R, and Ethernet passive optical networks (EPONs). The importance of power saving in IEEE 802-style networks can be seen from the IEEE 802.3 Working Group that has recently formed an Energy-Efficient Ethernet (EEE) Task Force, officially named 802.3az, to define a solution for reducing the average power consumption of copper Ethernet. A variety of conventional solutions has been proposed.

U.S. patent application Ser. No. 60/172,986 to Linghsiao Wang and James Yik for Power Saving For Ethernet MAC Control Logic teaches a method to control power within a communications device by stopping and starting the clock signals between the MAC control logic module and the frame processor module.

U.S. patent application Ser. No. 20090204828 to Wael William Diab, et al for Hybrid Technique in Energy Efficient Ethernet Physical Layer Devices teaches a hybrid approach that combines and manages multiple low power modes. The hybrid approach uses a combination of a low power idle technique and a physical interface technique that can be selectively activated within a communications device. In the physical interface technique, a link uses can use a high data rate when data transmission needs are high, and can use a low data rate when data transmission needs are low. In the low power idle technique, the transmitting side of the link can be designed to enter into a low power idle mode where the bulk of the physical interface and the energy on the link is turned off (put to sleep) when there is no data transmission. The transmitting physical interface is not turned completely off, rather the transmitting physical interface sends refresh signals to enable the receiver to maintain link synchronization and receive advance notice of wakeup from the low-power mode.

U.S. patent application Ser.No 20080304519 to David J. Koenen et al for Method for Ethernet Power Savings on Link Aggregated Groups teaches providing the ability to lower the power consumed by a group of Ethernet links when organized in a Link Aggregation Group. When the server or switch senses low bandwidth utilization across multiple links in the group, it will negotiate the transition of un-necessary links to a lower power state. When the bandwidth requirements increase, the algorithm will quickly re-establish links and distribute the Ethernet traffic across the multiple links when necessary.

U.S. patent application Ser. No 20090119524 to Robert Hays for Energy Efficient Ethernet Using Active/Idle Toggling teaches that an Ethernet controller may be configured to operate in an active power state to transmit or receive data packets at a maximum available link speed. Once the data packets are transmitted or received, the Ethernet controller may be configured to operate in an idle power state to reduce energy consumption. Hays defines the "idle power state" as a power state that is sufficient to maintain an open link with the link partner, but insufficient to transmit or receive data. In other words, the "idle power state maintains the Ethernet communications link between the Ethernet controller and the link partner.

In the context of this document, a user communications device, or more simply called a user device, refers to the equipment generally placed locally to a user, and provides a user with an interface for transmitting and receiving with an associated communications network (more simply called a network). In the context of this document, a network communications device, or more simply called a network device, refers to the equipment generally placed centrally to a plurality of users, operationally connected to user devices by a communications network, and provides an interface for transmitting and receiving with the associated communications network. A network device can provide communications between user devices on a network and/or communications between user devices and another network.

Conventional solutions for power saving in Ethernet networks focus on changing the data rate of the link or selectively lowering the power consumption of the physical (PHY) interface of a user device. While using a lower data rate to transmit data saves power over using a higher data rate, maintaining transmission at a lower data rate continues to use power. When transmitting via analog communications, for example copper Ethernet, the transmitter can transmit at lower power levels to reduce power, but the transmitter continues to use power. Controlling power within a user device by monitoring for idle transmission time and turning off the device's transmitter saves power for the transmitter, but the receiver continues to use power. The various conventional low power and idle states can save power for the transmitter and receiver, but still require power consumption in a user device to monitor the communications channel for a "wakeup" signal from a network device.

There is therefore a need for a system and method for power saving in networks in which the transmission medium does not facilitate receiver detection of a transmitter's signal that the transmitter is exiting low power state, including IEEE 802-style and ITU G.984-style networks including, but not limited to Ethernet networks. It is further desirable to use information from user and network devices for initiating power savings by the user device.

SUMMARY

A system and method for power saving in IEEE 802-style and ITU-T G.984-style networks overcomes the limitations of conventional techniques using information from user and network devices for initiating power savings by the user or network device, enabling power savings on links such as optical networks. This innovative technique provides a system and method for communications between user and network devices, facilitating either the user or network device initiating a sleep mode for the user device. The implementation of a sleep mode in a device allows powering down of the device's transmitter and receiver for a specified length of time, during which the transmitter and receiver (also referred to as the physical interface of the device) consume diminished power.

BRIEF DESCRIPTION OF FIGURES

The embodiment is herein described, by way of example only, with reference to the accompanying drawings, wherein:

FIG. 4, a table showing an implementation of the fields and octets for a SLEEP_REQ message.

FIG. 5, a table showing an implementation of the fields and octets for a CHANGE_SLEEP_MODE message.

FIG. 6, a table showing an implementation of the fields and octets for a SLEEP message.

DETAILED DESCRIPTION

Figure 1:
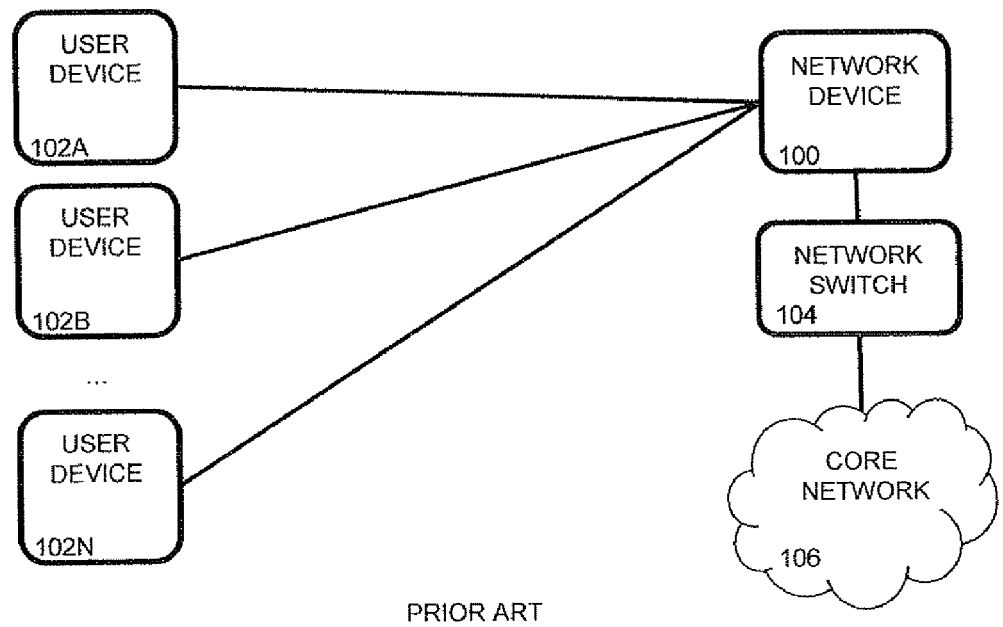
FIG. 1, a general diagram of an IEEE 802-style network.

The principles and operation of this system and method according to the present embodiment may be better understood with reference to the drawings and the accompanying description. One embodiment of a system and method for power saving in IEEE 802-style networks overcomes the limitations of conventional techniques using information from user and network devices for initiating power savings by the user or network device, enabling power savings on links, such as optical networks. This innovative technique provides a system and method for communications between user and network devices, facilitating either the user or network device initiating a sleep mode for the user device. The implementation of a sleep mode in a device allows powering down of the device's transmitter and receiver for a specified length of time, during which the transmitter and receiver (also referred to as the physical (PHY) interface of the device) consume diminished power. In the context of this document, consuming diminished power should be generally understood as consuming relatively less power than when a device operates in normal mode. The specific power consumption of a device will depend on the specific implementation of the device. In the case where the construction and operation of a device facilitates the transmitter and receiver being turned off, an implementation of the sleep mode facilitates the device consuming substantially no power. Note that realistically, depending on the construction of the physical interface, there may be components of the physical interface with stray and/or residual power consumption, so very accurate measurements of the power consumption of the physical interface may show a minimal power consumption during a given measurement period. This minimal power consumption is generally not considered relevant to the context of this invention.

In the context of this document, the term transmitter refers to the components of a device that enable the device to transmit data to an associated communications network. Depending on the construction of the transmitter, reference in this document to the transmitter should be understood to include one or more of the transmitter components of the device. Similarly, the term receiver refers to the components of a device that enable the device to receive data from an associated communications network and depending on the construction of the receiver, reference in this document to the receiver should be understood to include one or more of the receiver components of the device. In the context of this document, data is used as a general reference to all information communicated, unless otherwise specified.

This embodiment can be used for power saving in IEEE 802-style networks, including, but not limited to copper and optical networks. Generally, a network device in an IEEE 802-style network communicates with a plurality of user devices. While one or more user devices may be able to go into sleep mode, generally a network device is busy communicating with user devices, other networks, and taking care of other chores, so that network devices do not have the idle time to go into sleep mode. Although this operational description may be the normal operating state, this does not limit the implementations of this method to only user devices, and this method facilitates a network device going into sleep mode. A non-limiting example where a network includes only two devices (a single network device and a single user device) is an example of an implementation where a network device can go into sleep mode. When neither of the two devices has data to transmit to the other device, both devices can go into a sleep mode.

For clarity, in this description specific embodiments will be described using Ethernet passive optical network (EPON) components. In this case, user devices are implemented as optical network units (ONUS), network devices are implemented as optical line terminal (OLT) equipment, and the communications network is an EPON network.

Referring now to the drawings, FIG. 1 is a general diagram of an IEEE 802-style network. A network device 100 is connected to one or more user devices (102A, 102B, 102N) and provides communications between user devices on the network. Optionally the network device 100 is connected to one or more devices such as a network switch 104 to provide communications between user devices and other networks 106.

Figure 2:
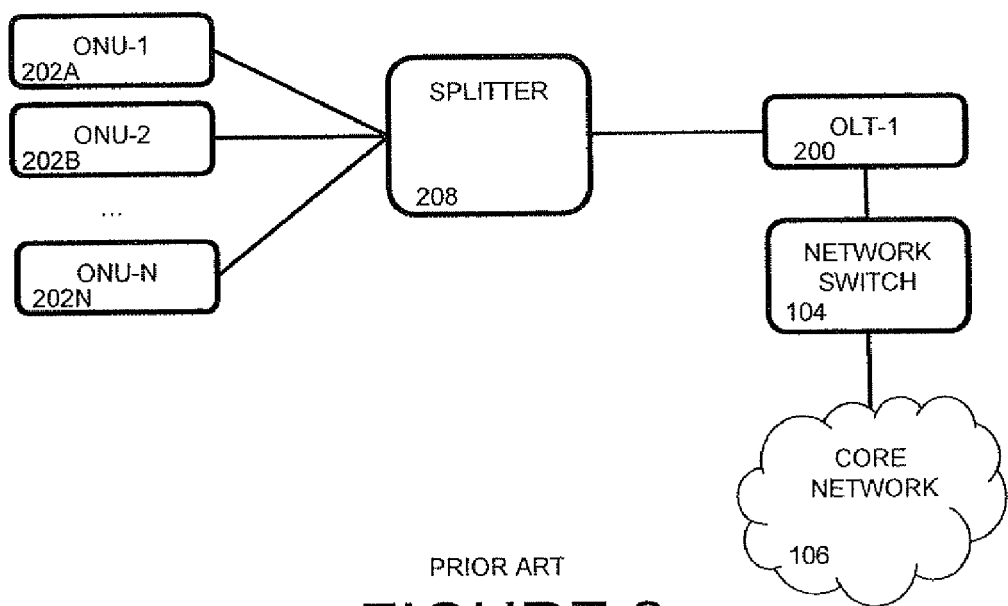
FIG. 2, a general diagram of an EPON.

Referring to FIG. 2, a general diagram of an EPON network shows one example implementation of an IEEE 802-style network. A network device, OLT 200, is connected via a passive optical splitter 208 to one or more user devices ONU-1 202A, ONU-2 202B, and ONU-N 202N), providing communications between user devices on the network. Optionally OLT 200 is connected to one or more devices such as a network switch 104 to provide communications between user devices and other networks 106.

Figure 3:
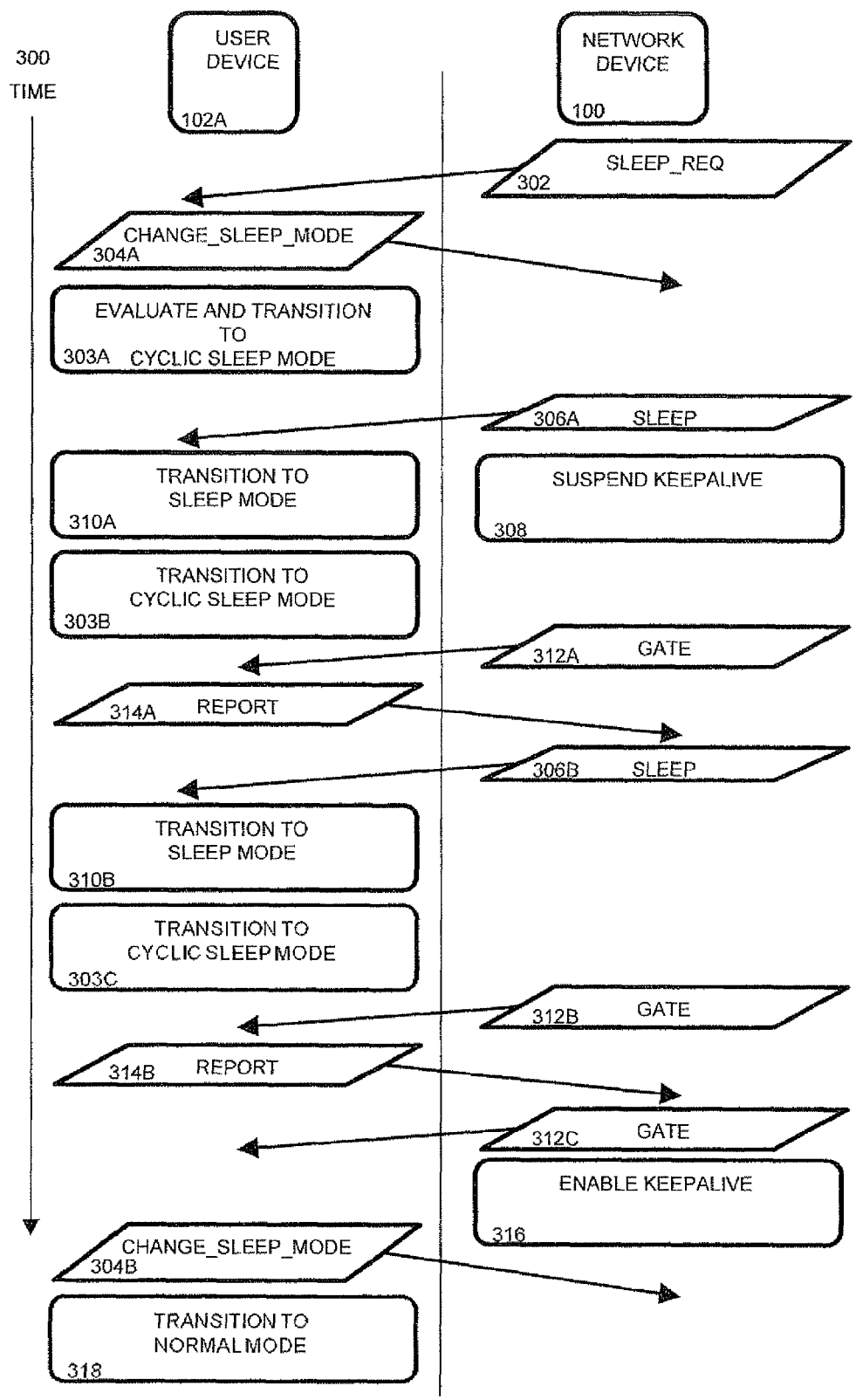
FIG. 3, a flowchart of generic sleep control message flow in an IEEE 802-style network.

Referring to FIG. 3, a flowchart of generic sleep control message flow in an IEEE 802-style network, time 300 is shown as a relative scale progressing down the page. This sleep control message flow facilitates powering down a device's transmitter and receiver for a given length of time, during which the transmitter and receiver consume diminished power, resulting in a power savings for the device. In a first case, the sleep control message flow starts when a network device 100 does not have any data to send to a user device 102A. The network device 100 may send a message (known as SLEEP_REQ 302) to a user device 102A requesting the user device to transition to cyclic sleep mode. If the user device 102A does not have any data to send, the user device responds by sending a request to go to sleep, known as CHANGE_SLEEP_MODE 304A, to the network device 100 and then evaluates and transitions to a cyclic sleep mode 303A. In a second case, if a user device 102A does not have data to send, the sleep control message flow can start with the user device sending CHANGE_SLEEP_MODE 304A to the network device 100.

In the context of this document, cyclic sleep mode is a state of operation where a device is awake, or in other words in a normal mode, able to transmit and receive data, and prepared to receive commands including a sleep command to transition to a sleep mode and a gate command to transition to a normal mode. Note that although in cyclic sleep mode a device can be able to transmit, a device would normally transition to cyclic sleep mode because the device lacks data to send, and implementations are possible where the transmitter is powered down when the device transitions to cyclic sleep mode.

In both cases, if the network device 100 does not have any data to send to the user device 102A, the network device sends an instruction for the user device to go to sleep for a determined sleep time, known as SLEEP 306A, to the user device. The network device 100 also suspends keepalive processes and other communications 308 to the user device 102A. When the user device 102A receives the SLEEP instruction 306A, the user device transitions to a sleep mode 310A, powering down appropriate components, normally including, but not limited to, the transmit logic and receiver. When the determined sleep time for sleeping has been reached, the user device 102A transitions to cyclic sleep mode 303B powering up the appropriate components, normally including, but not limited to, the transmitter and receiver. The user device is now prepared to receive a grant message from the network device allowing the user device to transmit (known as GATE). The network device 100 also knows when the determined sleep time for sleeping for the user device 102A has been reached, and sends a transmission opportunity message, shown as a GATE command 312A (grant message), to the user device.

If the user device 102A lacks data to send to the network device 100, the user device sends a REPORT 314A signaling that the user device has no data to send and is thus able to go back to sleep. When the network device 100 does not have any data to send to the user device 102A, the network device may send a SLEEP 306B, to the user device. When the user device 102A receives the SLEEP instruction 306A, the user device transitions to a sleep mode 310B, as described above. When the given length of time for sleeping has been reached, the user device 102A again transitions to cyclic sleep mode 303C and the network device 100 sends a GATE 312B, as described above.

If the user device 102A has data to send to the network device 100, the user device sends a REPORT 314B signaling that the user device 102A wants to transmit. Network device 100 sends a GATE 312C to the user device 102A and also enables keepalive processes and other communications 316 to the user device. The user device 102A sends a message that the user device is transitioning from cyclic sleep mode to normal mode, shown as a CHANGE_SLEEP_MODE 304B. The user device 102A transitions from cyclic sleep mode to normal mode 318. Communications now resumes normally. If there is again no data to send, the sleep control message flow can be repeated.

In a case where a network device receives a CHANGE_SLEEP_MODE 304 from a user device 102A and the network device has data to send to the user device, the network device sends the data to the user device as a normal data message. When the user device does not receive a SLEEP instruction 306, instead receiving data, the user device transitions from cyclic sleep mode to normal mode of operations.

In one implementation, the determined sleep time for sleeping can be manually configured by the system operators on the network device or user device. In another implementation, the determined sleep time can be calculated by the network device and sent to the user device as part of the sleep message. In an implementation where time is synchronized in the user and network devices, the determined sleep time can be an absolute time in the future. In a non-limiting example, if the current time is a first timestamp (F424 base16) the absolute determined sleep time can be a second timestamp (605234 base16=what the timestamp will be 100 msec in the future). In another implementation, the determined sleep time can be a relative time. In a non-limiting example, a relative determined sleep time can be a value of (BA2E8BA base16=100 msec). Based on this description and the specific application, other implementations of a determined sleep time will be clear to one skilled in the art.

In an optional implementation, the network device 100 monitors communications traffic load, a user device 102A is identified as being lightly loaded, and the network device sends a SLEEP_REQ 302, to the user device. In this implementation, although the user device has data to send, the user device accepts the SLEEP_REQ, transitions to cyclic sleep mode, and sends a CHANGE_SLEEP_MODE to the network device. Data is buffered in the user device until the user device transitions to a normal mode of operation, after which the data is sent with loading on the communications channel relatively higher.

In an optional implementation, a network device can initially send a SLEEP to a single user device that has requested CHANGE_SLEEP_MODE. Subsequent SLEEP messages can be broadcast to all user devices on the network and all listening user devices that are in the cyclic sleep mode then transition to a sleep mode.

In an optional implementation, CHANGE_SLEEP_MODE 304C is sent by the user device immediately after receipt of GATE 312B. In another optional implementation, the user device sends user data immediately after receipt of GATE 312B thereby implicitly signaling the network device that the user device has transitioned to normal mode.

A specific algorithm for deciding to send a SLEEP is not within the context of this description. One implementation is to base the decision of a network device to send a SLEEP on the receipt of a SLEEP_REQ from a user device.

In some applications, changing the order of transitioning modes, sending messages, and suspending and enabling may be preferable. In one non-limiting example, a network device 100 suspends keepalive processes and other communications 308, and then sends SLEEP instruction 306, to the user device 102A. Based on this description and the specific application, other implementations will be clear to one skilled in the art.

For implementation of the above-described method, the messages sent between a user device and a network device need to contain sufficient information to provide the control needed for the sleep control message flow (power-saving control). In an IEEE 802-style network, the media access control (MAC) layer specification is not sufficient to provide this control. Therefore, there is a need to provide a mechanism with sufficient control for sleep control message flow.

One implementation of a mechanism for providing control for sleep control message flow uses the message formats and state information of the network control layers above the MAC layer (for example, the 802.1 MAC client layer or the 802.3 MAC Control layer). The network control layers include a mechanism for establishing time synchronization, and this shared time concept can be used for control purposes. The existing time synchronization mechanism is extended so that a transmitting device can send a special message to inform a receiving device that the receiving device will not receive data for a determined sleep time.

In an Ethernet passive optical network (EPON), sleep control message flow can be implemented in the network control layer above the MAC layer used for control of multiplexing, called the multipoint MAC control [MPCP] layer. The existing MPCP specification includes a mechanism for establishing time synchronization and using the shared time concept (with guard regions) to enable multiplexed transmission. This existing MPCP time synchronization mechanism is extended so that a transmitting device can send a special message to inform a receiving device that the receiving device will not receive data for a determined sleep time. In addition, the MPCP layer is modified so the keepalive functions are suspended while a user device is in sleep mode. Note the control handshakes use the IEEE 802 conventions, for example, only one notification, in contrast to GPON that uses 3 notifications. In an EPON, the above-described user device and network device are implemented as optical networking unit (ONU) and optical line terminal (OLT), respectively.

Referring to FIG. 4, a table showing an implementation of the fields and octets for a SLEEP_REQ message, the fields are based on the format of a generic MPCP frame (also known as MPCP data units—MPCPDUs). All MPCPDUs are 64-byte MAC control frames consisting of the following fields:

Destination address (DA)—The destination address field of a MAC control frame contains the 48-bit address of the device (s) for which the frame is intended.

Source address (SA)—The source address field of a MAC control frame contains the 48-bit individual address of the device sending the frame.

Length/type—The length/type field of a MAC control frame is a 2-octet field that contains the hexadecimal value 88-08. This value has been universally assigned to identify MAC control frames.

Opcode—The opcode field is a 2-octet field that identifies the specific MAC control frame.

OUI—The OUI field is a 3-octet configurable field.

Extended opcode—Configurable. In this implementation of SLEEP_REQ, the value $00\text{-}00_{16}$ is used to indicate that this frame is a SLEEP_REQ message.

Pad/reserved—These fields carry information pertinent to specific MPCP functions. The portion of the payload not used by the opcode-specific fields should be padded with zeros.

Frame check sequence (FCS)—The FCS field carries a CRC-32 value used by the MAC to verify integrity of received frames.

Referring to FIG. 5, a table showing an implementation of the fields and octets for a CHANGE_SLEEP_MODE message, the fields are similar to those described for SLEEP_REQ. The extended opcode filed is configured with the value $00\text{-}01_{16}$ that is used to indicate that this frame is a CHANGE_SLEEP_MODE message. An additional field is specified: New mode—a 1-octet field indicating whether the device is requesting to change from cyclic sleep mode to normal mode (indicated by the value 0) or from normal mode to cyclic sleep mode (indicated by the value 1).

Referring to FIG. 6, a table showing an implementation of the fields and octets for a SLEEP message, the fields are similar to those described for SLEEP_REQ. The extended opcode filed is configured with the value $00\text{-}02_{16}$ that is used to indicate that this frame is a SLEEP message. An additional field is specified: Wakeup time—a 4-octet field indicating the determined sleep time for sleeping. In an EPON network, this value is preferably the EPON clock, a timestamp based on time quanta (1 time quanta, or TQ is 16 nsec).

As described above, the implementation of specific fields, lengths, and values for control needed for the sleep control message flow (power-saving control) can vary based on the application. Based on this description and the specific application, other implementations of a control mechanism will be clear to one skilled in the art.

Figure 7:
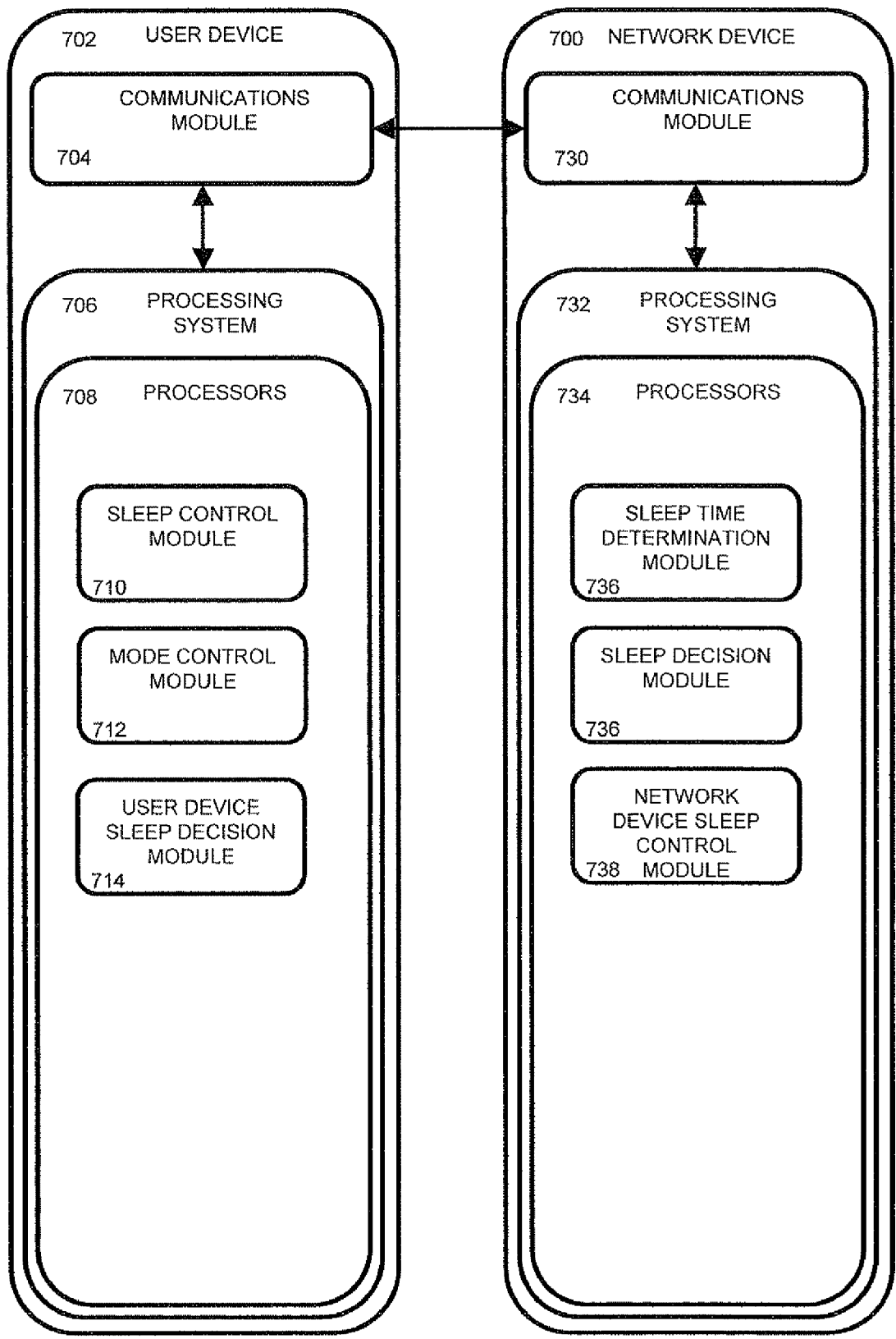
FIG. 7, a diagram of a system for power saving in a communications network.

Referring now to the drawings, FIG. 7 is a diagram of a system for power saving in a communications network. A user device 702 includes a communications module 704 for communicating over a network and a processing system 706 operationally connected to the communications module 704, containing one or more processors 708. The processors 708 are configured with a sleep control module 710 for initiating sleep control message flow and a mode control module 712 configured for transitioning the user device to cyclic sleep mode when sleep control message flow is initiated. Note that for clarity connections between modules are not shown in FIG. 7.

A network device 700 is operationally connected to the user device. The network device 700 includes a communications module 730 for communicating over a network and a processing system 732 operationally connected to the communications module, containing one or more processors 734. The processors 734 are configured with a sleep time determination module 736 for determining a sleep time for the user device to be in a sleep mode wherein the user device 702 consumes diminished power for communicating with the network device 700. The processors 734 are also configured with a sleep decision module 736 configured for determining if the network device 700 needs to send data to the user device 702, and actuating sending a data message from the network device. If the network device 700 lacks data to send to the user device 702, the sleep decision module 736 actuates sending a sleep message from the network device to the user device and actuates the network device suspending keepalive processes associated with the user device.

The user device processing system is also configured with a user device sleep decision module 714 configured that when the user device 702 is in cyclic sleep mode, upon the user device receiving from the network device 700 a data message, actuating transitioning the user device to a normal mode; or upon the user device receiving from the network device a sleep message, actuating the user device transitioning to a sleep mode for the sleep time.

The user device is further configured to transition, based on said sleep time, from sleep mode to cyclic sleep mode. The network device is further configured to send, based on the sleep time, a first grant message to the user device and the user device is further configured that upon receiving the first grant message, sending a first report message to the network device signaling that the user device has data to send. The network device is further configured that upon receiving the first report message the network device: enables the keepalive processes associated with the user device; and sends a second grant message from the network device to the user device. The user device is further configured that upon receiving the second grant message the user device: transitions from cyclic sleep mode to a normal mode; and sends a second change sleep mode message to the network device.

In an optional implementation, the user device sleep control module 710 is further configured to actuate sending from the user device 702 a first change sleep mode message to the network device 700. In another optional implementation, the network device processing system 732 is further configured with a network device sleep control module 738 for initiating sleep control message flow by actuating sending from the network device 700 a sleep request message to the user device 702.

In an optional implementation, the network device is further configured for initiating sleep control message flow based on a communications traffic load. In another optional implementation, the sleep time determination module is further configured to accept manual configuration. In another optional implementation, the network device is further configured to send the sleep time to the user device. In another optional implementation, the sleep message further includes the sleep time. In another optional implementation, the network device is further configured for broadcasting the sleep message to a plurality of user devices that includes the user device.

The user device is further configured that upon receiving the first grant message, sending a second report message to the network device signaling that the user device lacks data to send. The network device is further configured that upon receiving the second report message: if the network device lacks data to send to the user device sending a sleep message from the network device to the user device. If the network device has data to send to the user device: sending a second grant message from the network device to the user device; and the network device enabling the keepalive processes associated with the user device.

In an implementation, the user device and the network device are configured to communicate via an IEEE 802 standard network.

In an implementation, the user device is an ONU of an Ethernet passive optical network (EPON) and wherein said network device is an OLT of the EPON.

Depending on the application, the functions of the various modules described above can be combined or separated for implementation. Based on this description and the specific application, other implementations of modules will be clear to one skilled in the art.

It will be appreciated that the above descriptions are intended only to serve as examples, and that many other embodiments are possible within the scope of the present invention as defined in the appended claims.

What is claimed is:

1. A method for power saving in a communications network comprising the steps of:
    (a) initiating sleep control message flow between a user device and a network device;
    (b) transitioning said user device to cyclic sleep mode;
    (c) determining a sleep time for said user device to be in a sleep mode wherein said user device consumes diminished power for communicating with said network device;
    (d) while said user device is in said cyclic sleep mode, if said network device needs to send data to said user device:
        (i) sending from said network device a data message; and
        (ii) said user device upon receiving said data message transitioning to a normal mode; and
    (e) while said user device is in said cyclic sleep mode, if said network device lacks data to send to said user device:
        (i) sending from said network device a sleep message to said user device;
        (ii) said network device suspending keepalive processes associated with said user device; and
        (iii) upon receiving at said user device said sleep message, said user device transitions to a sleep mode for said sleep time.

2. The method of claim 1 wherein said initiating sleep control message flow is initiated by sending from said user device a first change sleep mode message to said network device.

3. The method of claim 1 wherein said initiating sleep control message flow is initiated by sending from said network device a sleep request message to said user device.

4. The method of claim 3 wherein initiating sleep control message flow is based on a communications traffic load.

5. The method of claim 1 wherein the determined sleep time is manually configured.

6. The method of claim 1 wherein said sleep time is sent from said network device to said user device.

7. The method of claim 1 wherein said sleep time is included in said sleep message.

8. The method of claim 1 wherein said sending of said sleep message to said user device is effected by broadcasting said sleep message to a plurality of user devices that includes said user device.

9. The method of claim 1 wherein said user device and said network device communicate via an IEEE 802standard network.

10. The method of claim 1 wherein said user device is an ONU of an Ethernet passive optical network (EPON) and wherein said network device is an OLT of said EPON.

11. A system for power saving in a communications network comprising:
    (a) a user device including:
        (i) a communications module for communicating over a network; and
        (ii) a processing system operationally connected to said communications module, containing at least one processor configured with:
            (A) a sleep control module for initiating sleep control message flow; and
            (B) a mode control module configured for transitioning said user device to cyclic sleep mode upon said initiating sleep control message flow;
    (b) a network device operationally connected to said user device, including:
        (i) a communications module for communicating over a network;
        and (ii) a processing system operationally connected to said communications module, containing at least one processor configured with:
            (A) a sleep time determination module for determining a sleep time for said user device to be in a sleep mode wherein said user device consumes diminished power for communicating with said network device; and
            (B) a sleep decision module configured for determining:
                (I) if said network device needs to send data to said user device, actuating sending from said network device a data message; and
                (II) if said network device lacks data to send to said user device:

(a) actuating sending from said network device a sleep message to said user device; and
(b) actuating said network device suspending keepalive processes associated with said user device; and
(c) a user device sleep decision module in said user device processing system, configured that when said user device is in cyclic sleep mode:
(i) upon said user device receiving from said network device said data message, actuating transitioning said user device to a normal mode; and
(ii) upon said user device receiving from said network device said sleep message, actuating said user device transitioning to a sleep mode for said sleep time.

12. The system of claim 11 wherein said user device sleep control module is further configured to actuate sending from said user device a first change sleep mode message to said network device.

13. The system of claim 11 wherein said network device processing system is further configured with a network device sleep control module for initiating sleep control message flow by actuating sending from said network device a sleep request message to said user device.

14. The system of claim 13 wherein said network device is further configured for initiating sleep control message flow based on a communications traffic load.

15. The system of claim 11 wherein said sleep time determination module is further configured to accept manual configuration.

16. The system of claim 11 wherein said network device is further configured to send said sleep time to said user device.

17. The system of claim 11 wherein said sleep message further includes said sleep time.

18. The system of claim 11 wherein said network device is further configured for broadcasting said sleep message to a plurality of user devices that includes said user device.

19. The system of claim 11 wherein said user device and said network device are configured to communicate via an IEEE 802 standard network.

20. The system of claim 11 wherein said user device is an ONU of an Ethernet passive optical network (EPON) and wherein said network device is an OLT of said EPON.

21. A method for power saving in a communications network comprising the steps of:
(a) initiating sleep control message flow between a user device and a network device;
(b) transitioning said user device to cyclic sleep mode;
(c) determining a sleep time for said user device to be in a sleep mode wherein said user device consumes diminished power for communicating with said network device;
(d) if said network device needs to send data to said user device:
(i) sending from said network device a data message; and
(ii) said user device upon receiving said data message transitioning to a normal mode;
(e) if said network device lacks data to send to said user device:
(i) sending from said network device a sleep message to said user device;
(ii) said network device suspending keepalive processes associated with said user device; and
(iii) upon receiving at said user device said sleep message, said user device transitions to a sleep mode for said sleep time;
(f) transitioning, based on said sleep time, said user device from said sleep mode to said cyclic sleep mode;
(g) sending, based on said sleep time, a first grant message from said network device to said user device;
(h) upon receiving said first grant message, said user device sending a first report message to said network device signaling that said user device has data to send;
(i) upon receiving said first report message, said network device:
(i) enabling said keepalive processes associated with said user device; and
(ii) sending a second grant message from said network device to said user device; and
(j) upon receiving at said user device said second grant message, said user device:
(i) transitioning from said cyclic sleep mode to a normal mode; and
(ii) sending a second change sleep mode message to said network device.

22. The method of claim 21 further including upon receiving said first grant message, said user device sending a second report message to said network device signaling that said user device lacks data to send, wherein:
(a) if said network device lacks data to send to said user device:
(i) sending a sleep message from said network device to said user device; and
(ii) upon receiving at said user device said sleep message, said user device transitions to a sleep mode for said sleep time; and
(b) if said network device has data to send to said user device:
(i) sending a third grant message from said network device to said user device;
(ii) said network device enabling said keepalive processes associated with said user device; and
(iii) upon receiving at said user device said second grant message, said user device transitioning from said cyclic sleep mode to a normal mode, and sending a second change sleep mode message to said network device.

23. A system for power saving in a communications network comprising:
(a) a user device including:
(i) a communications module for communicating over a network; and
(ii) a processing system operationally connected to said communications module, containing at least one processor configured with:
(A) a sleep control module for initiating sleep control message flow; and
(B) a mode control module configured for transitioning said user device to cyclic sleep mode upon said initiating sleep control message flow;
(b) a network device operationally connected to said user device, including:
(i) a communications module for communicating over a network; and
(ii) a processing system operationally connected to said communications module, containing at least one processor configured with:
(A) a sleep time determination module for determining a sleep time for said user device to be in a sleep mode wherein said user device consumes diminished power for communicating with said network device; and (B) a sleep decision module configured for determining:
  (I) if said network device needs to send data to said user device, actuating sending from said network device a data message; and
  (II) if said network device lacks data to send to said user device:
    (a) actuating sending from said network device a sleep message to said user device; and
    (b) actuating said network device suspending keepalive processes associated with said user device; and
(c) a user device sleep decision module in said user device processing system, configured that when said user device is in cyclic sleep mode:
  (i) upon said user device receiving from said network device said data message, actuating transitioning said user device to a normal mode; and
  (ii) upon said user device receiving from said network device said sleep message, actuating said user device transitioning to a sleep mode for said sleep time;
wherein said user device is further configured to transition, based on said sleep time, from said sleep mode to said cyclic sleep mode;
said network device is further configured to send, based on said sleep time, a first grant message to said user device;
said user device is further configured that upon receiving said first grant message, sending a first report message to said network device signaling that said user device has data to send;
said network device is further configured that upon receiving said first report message:
  (i) enabling said keepalive processes associated with said user device; and
  (ii) sending a second grant message from said network device to said user device; and
said user device is further configured that upon receiving said second grant message:
  (i) transitioning from said cyclic sleep mode to a normal mode;
and
  (ii) sending a second change sleep mode message to said network device.

24. The system of claim 23 wherein
(a) said user device is further configured that upon receiving said first grant message, sending a second report message to said network device signaling that said user device lacks data to send; and
(b) said network device is further configured that upon receiving said second report message:
  (i) if said network device lacks data to send to said user device:
    (A) sending a sleep message from said network device to said user device; and
  (ii) if said network device has data to send to said user device:
    (A) sending a second grant message from said network device to said user device; and
    (B) said network device enabling said keepalive processes associated with said user device.

* * * * *